(12) United States Patent
Liu

(10) Patent No.: US 10,844,967 B2
(45) Date of Patent: Nov. 24, 2020

(54) INFLATION SYSTEM

(71) Applicant: Guangdong Travelmall Health Technology Co., Ltd., Dongguan (CN)

(72) Inventor: Zhiming Liu, Dongguan (CN)

(73) Assignee: GUANGDONG TRAVELMALL HEALTH TECHNOLOGY CO., LTD., Dongguan (CN)

( * ) Notice: Subject to any disclaimer, the term of this patent is extended or adjusted under 35 U.S.C. 154(b) by 7 days.

(21) Appl. No.: 16/201,254

(22) Filed: Nov. 27, 2018

(65) Prior Publication Data

US 2019/0093773 A1 Mar. 28, 2019

(30) Foreign Application Priority Data

May 18, 2018 (CN) .......................... 2018 1 0482021

(51) Int. Cl.
*F16K 15/20* (2006.01)
*F16K 11/00* (2006.01)
*F16K 15/18* (2006.01)
*F16K 11/10* (2006.01)

(52) U.S. Cl.
CPC ............ *F16K 11/00* (2013.01); *F16K 11/105* (2013.01); *F16K 15/185* (2013.01); *F16K 15/202* (2013.01); *Y10T 137/3646* (2015.04); *Y10T 137/86863* (2015.04)

(58) Field of Classification Search
CPC ...... F04B 33/00; F04B 39/123; F16K 11/105; Y10T 137/36; Y10T 137/3646; Y10T 137/86863
USPC ............................... 417/480, 435; 5/710, 713
See application file for complete search history.

(56) References Cited

U.S. PATENT DOCUMENTS

| 4,098,291 A | * | 7/1978 | Clark | ................... F16K 11/085 |
| | | | | 137/625.68 |
| 6,745,996 B1 | * | 6/2004 | Guthrie | ................. F16K 11/074 |
| | | | | 137/624.12 |
| 2014/0099222 A1 | | 4/2014 | Yu | |
| 2017/0191483 A1 | * | 7/2017 | Liu | ....................... F16K 15/147 |
| 2020/0056711 A1 | * | 2/2020 | Huang | ................... A47C 27/08 |

FOREIGN PATENT DOCUMENTS

| CN | 202746683 U | 2/2013 |
| CN | 106593902 A | 4/2017 |
| CN | 206159572 U | 5/2017 |
| CN | 108591546 A | 9/2018 |
| CN | 108679274 A | 10/2018 |
| EP | 2857682 A1 | 4/2015 |

* cited by examiner

*Primary Examiner* — Robert K Arundale
(74) *Attorney, Agent, or Firm* — Shimokaji IP

(57) ABSTRACT

An inflation system includes a base, an adjuster and a first sealing device. The base is provided with a receiving cavity, an air inlet and an inflation inlet, the adjuster is rotatably configured in the receiving cavity, and the first sealing device is adapted for sealing the inflation inlet. The adjuster is turnable between a communication position and a separation position to open or close the inflation inlet, at the communication position, the first sealing device is openable under an action of high pressure air to communicate the inflation inlet with the air inlet; at the separation position, the adjuster stops high pressure air from opening the first sealing device thereby separating the inflation inlet from the air inlet. Different air passages can be selected in the invention, and the usage is convenient and safe.

20 Claims, 19 Drawing Sheets

INFLATION SYSTEM

RELATED APPLICATIONS

This application claims the benefit of priority to Chinese Invention Application No. 201810482021.X, filed May 18, 2018, which is hereby incorporated by reference in its entirety.

FIELD OF THE INVENTION

The invention relates to an inflation system, and more particularly to an inflation system that can selectively inflate with different air passages.

BACKGROUND OF THE INVENTION

Inflatable products such as inflatable toys, swing rings, inflatable pillows or inflatable mattresses will be deflated when not in use, so as to reduce the size to store and carry conveniently. While in use, the products need to be inflated. The original inflating way is to directly blow air to the product by using the mouth; apparently, such a way is inefficient and unhealthful. An efficient inflation way is to use an inflation tool such as an inflator or an air inflation pump to save time and effort, but such a tool is complicated and heavy, which is inconvenient to carry. Nowadays, an inflation device including valves and air bags is developed. The product can be inflated by compressing the air bag and deflated by pressing the valve. However, such an inflation device is not safe because it may be pressed unexpectedly.

Furthermore, the current inflation device only has one air passage to connect with one air pocket of the inflatable product, thus it's not desirable if the inflatable product with multiple and independent air pockets.

Therefore, there is a need for providing an inflation system that can selectively inflate with different air passages, to overcome the above-mentioned drawbacks.

SUMMARY OF THE INVENTION

One objective of the present invention is to provide an inflation system that can selectively inflate with different air passages.

To achieve the above-mentioned objective, the present invention provides an inflation system including a base, an adjuster and a first sealing device. The base is provided with a receiving cavity, an air inlet and an inflation inlet, the adjuster is rotatably configured in the receiving cavity, and the first sealing device is adapted for sealing the inflation inlet. The adjuster is turnable between a communication position and a separation position to open or close the inflation inlet, at the communication position, the first sealing device is openable under an action of high pressure air to communicate the inflation inlet with the air inlet; at the separation position, the adjuster stops high pressure air from opening the first sealing device thereby separating the inflation inlet from the air inlet.

In comparison with the prior art, because the adjuster of the present invention is turnable and configured in the receiving cavity, and an air inlet and an inflation inlet are configured at the base, thus the inflation inlet can be communicated with the air inlet to inflate by turning the adjuster. When the inflation inlet is blocked by the adjuster, that is, the inflation inlet is hermetically separated from the air inlet, the inflation is locked, and the air in the inflatable product is sealed, thus undesired deflation is prevented, thereby safety of the inflatable product is improved.

Preferably, the adjuster is rotatably configured in the receiving cavity.

Preferably, the first sealing device is adapted for unilaterally sealing the inflation inlet, so that the inflation inlet is opened when inflation is needed and is sealed when inflation is unnecessary.

Preferably, an air cavity is defined in the adjuster and communicated with the air inlet, a through hole communicated with the air cavity is provided at a bottom wall of the adjuster; by means of the adjuster, the inflation inlet is selectively communicated with the through hole or sealed by the bottom wall.

Preferably, a plurality of inflation inlets are provided on the base, the through hole is selectively communicated with any one of the inflation inlets, and the bottom wall is adapted for sealing the rest inflation inlets.

Preferably, the air cavity is communicated with the air inlet via flexible tube.

Preferably, the inflation device further includes a second sealing device, wherein the adjuster is provided with an air vent communicating with the air cavity, and the second sealing device is configured at the air vent to seal the air vent unilaterally.

Preferably, the inflation device further includes an operating member movably configured at the air vent, wherein the second sealing device is fixed on the operating member, and the first sealing device is actuated to open thereby communicating the inflation inlet with the air vent.

Preferably, the operating member is provided with a pin, by which the operating member actuates to open the first sealing device.

Preferably, a spring is configured between the operating member and the adjuster, by which the operating member actuates to release the first sealing device.

Preferably, spools movably configured relative to the adjuster and corresponding with the inflation inlet, and the adjuster is adapted for driving the spools to move up and down to connect with or block off the inflation inlet.

Preferably, the adjuster is provided with a rail, by which the adjuster drives the spool to move.

Preferably, the base is provided with a plurality of inflation inlets, and each spool is corresponding to each inflation inlet.

Preferably, the rail has a top and a bottom, the spools located at the top of the rail are adapted for communicating with the inflation inlet, and the spools located at the bottom of the rail are adapted for blocking off the inflation inlet.

Preferably, the rail is located at a lower edge of the adjuster, and the lower edge of the adjuster is provided with a recess to form the top of the rail; the inflation system further comprises a first spring element for supplying spring force to make the spools press against the rail.

Preferably, the adjuster is provided with a limiting part which can be driven to block off or open the inflation inlet, thereby hermetically separating the receiving cavity from the inflation inlet or communicating the receiving cavity with the inflation inlet.

Preferably, the inflation system further includes a second sealing device, wherein the base is provided with an air vent communicating with the air cavity, and the second sealing device is configured at the air vent to seal the air vent unilaterally.

Preferably, the inflation system further includes an operating member configured on the base, wherein the operating member is connected with the adjuster to drive the adjuster.

Preferably, the operating member is movably configured at the air vent, the second sealing device is fixed to the operating member, and the first sealing device is opened by the operating member to communicate the inflation inlet with the air vent.

Preferably, the operating member is provided with a pin, the pin and the limiting part are configured at an angle along a bottom projection direction of the receiving cavity, and the first sealing device is driven to open by means of the pin of the operating member.

Preferably, a spring is configured between the operating member and the base.

Preferably, the inflation system further includes an inflation module communicated with the air inlet.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
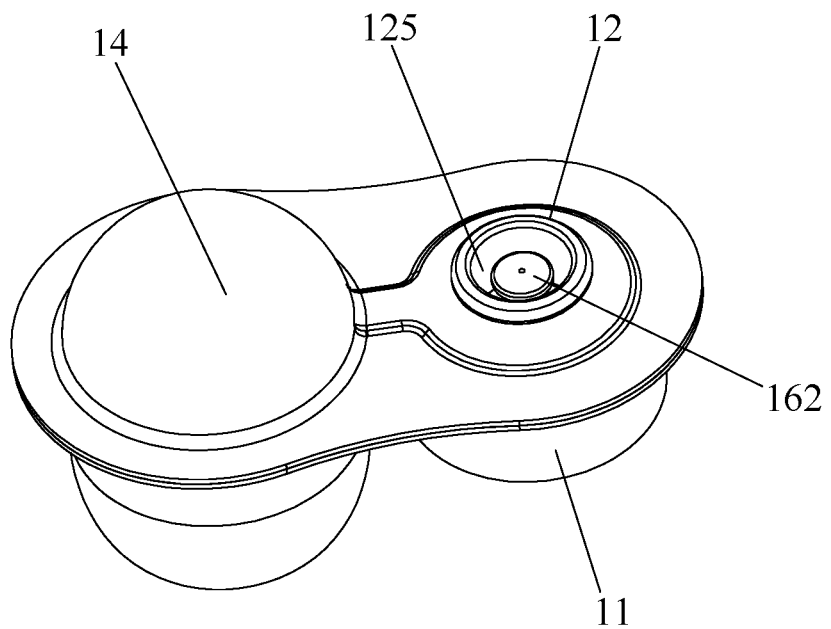
FIG. 1 is a perspective view of an inflation system according to a first embodiment of the present invention.
Figure 2:
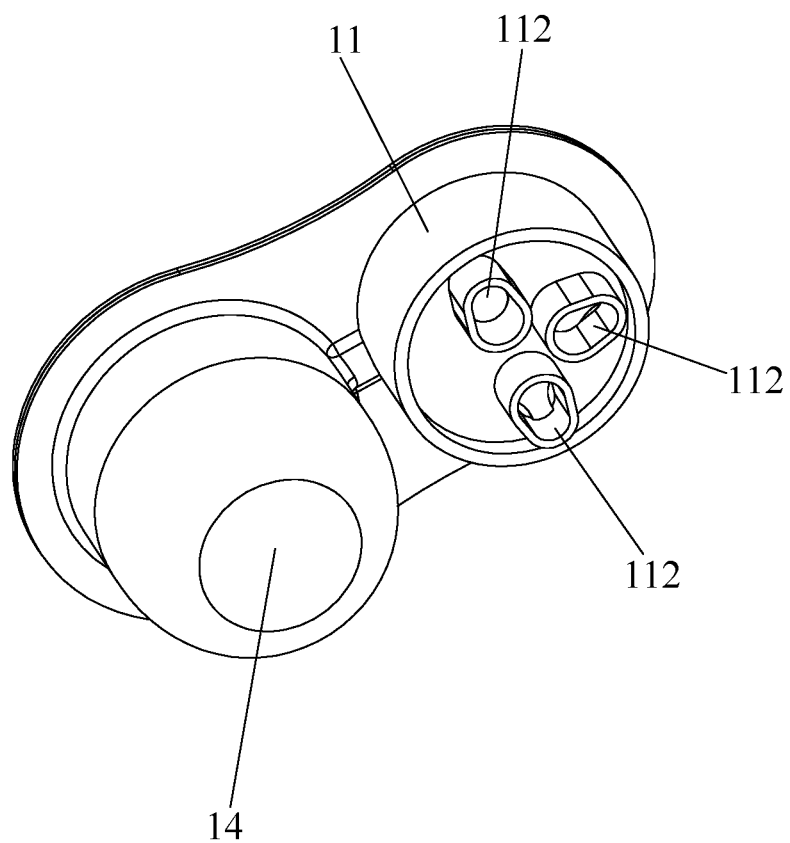
FIG. 2 is another perspective view of the inflation system according to the first embodiment of the present invention.
Figure 3:
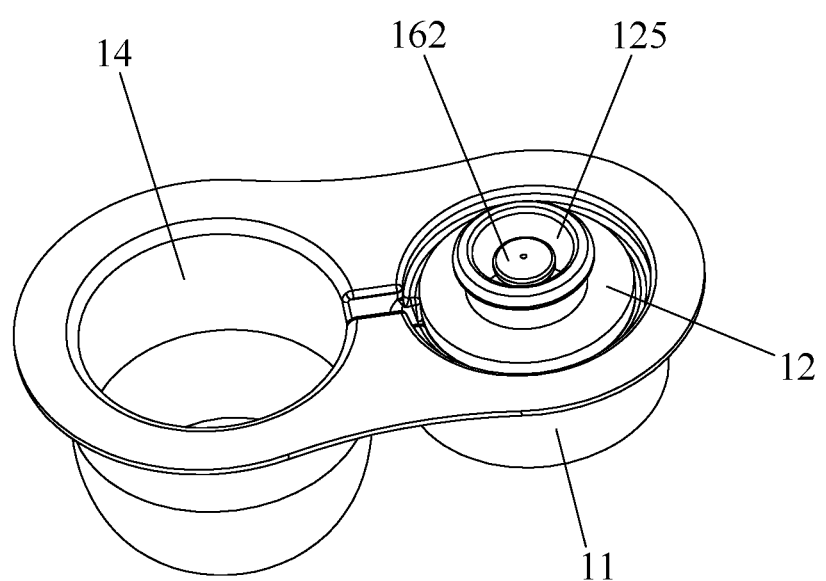
FIG. 3 is a view showing an internal structure of the inflation system according to the first embodiment of the present invention.

The present invention provides an inflation system which can be mounted on inflatable products such as inflatable pillows, inflatable toys, and inflatable mattress to inflate efficiently. The inflation system includes a base, an adjuster and a first sealing device. The base is provided with a receiving cavity, an air inlet and an inflation inlet, the adjuster is rotatably configured in the receiving cavity, and the first sealing device is adapted for sealing the inflation inlet. The adjuster is turnable between a communication position and a separation position to open or close the inflation inlet, at the communication position, the first sealing device is openable under an action of high pressure air to communicate the inflation inlet with the air inlet; at the separation position, the adjuster stops high pressure air from opening the first sealing device thereby separating the inflation inlet from the air inlet. Specifically, three embodiments are shown to explain the present invention.

Referring to FIGS. 1-5, the inflation system 100 according to the first embodiment includes a base 11, an adjuster 12, a first sealing device 13 and an air source 14. The base 11 is provided with an air inlet 111 and an inflation inlet 112, the air inlet 111 is communicated with the air source 14 which is an air bag, and the inflation inlet 112 is connected with an air bag of the inflatable product. The first sealing device 13 is configured at the inflation inlet 112 to seal the inflation inlet 112 unilaterally, so that the inflation inlet 112 is opened when inflation is needed and is closed when inflation is unnecessary. Specifically, the first sealing device 13 is a check valve and is in a form of resilient sealing leaf. One end of the resilient sealing leaf is fixed on the base 11, and another end of the resilient sealing leaf is free. The inflation inlet 112 is sealed by the resilient sealing leaf by means of its resilient force, and the resilient sealing leaf can be opened towards the air inlet direction. A receiving cavity 113 is configured in the base 11, the adjuster 12 is configured in the receiving cavity 113, and the position of the adjuster 12 is changeable, the outer wall of the adjuster 12 is pressed against the inner wall of the base 11 hermetically. In this embodiment, the adjuster 12 is rotatable around the center axis itself, and the adjuster 12 is an eccentric roller structure. Therefore, the adjuster 12 can rotate on the base 11 with a certain angle. Further, an air cavity 121 is defined in the adjuster 12, which is communicated with the air inlet 111.

Figure 4:
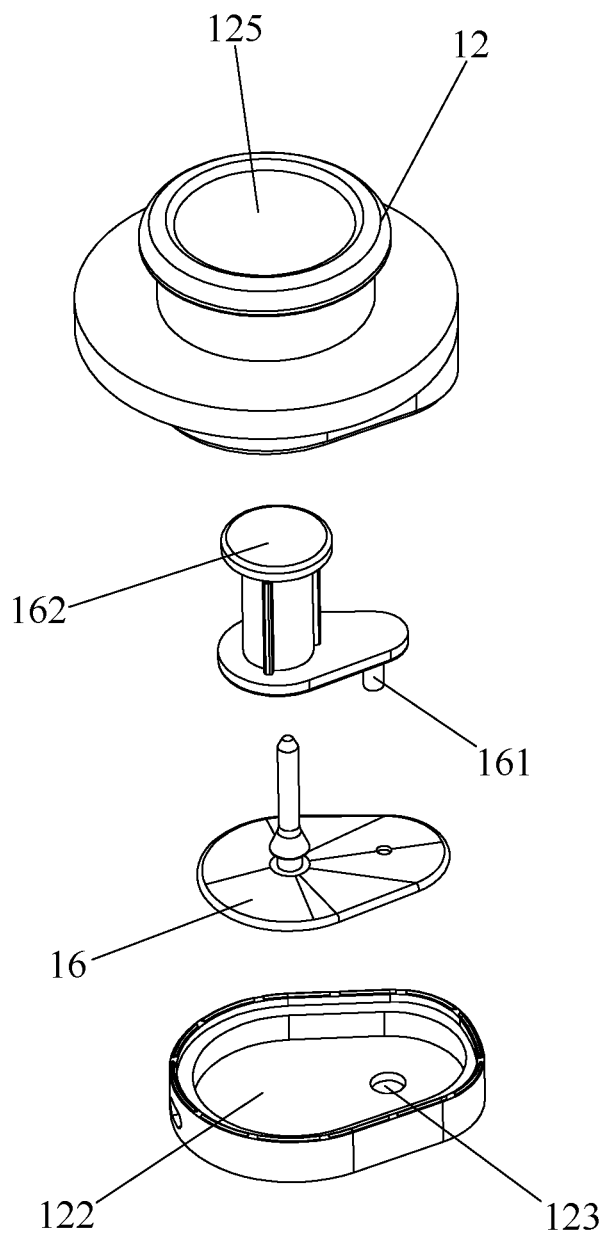
FIG. 4 is an exploded view of the internal structure of the inflation system according to the first embodiment of the present invention.
Figure 5:
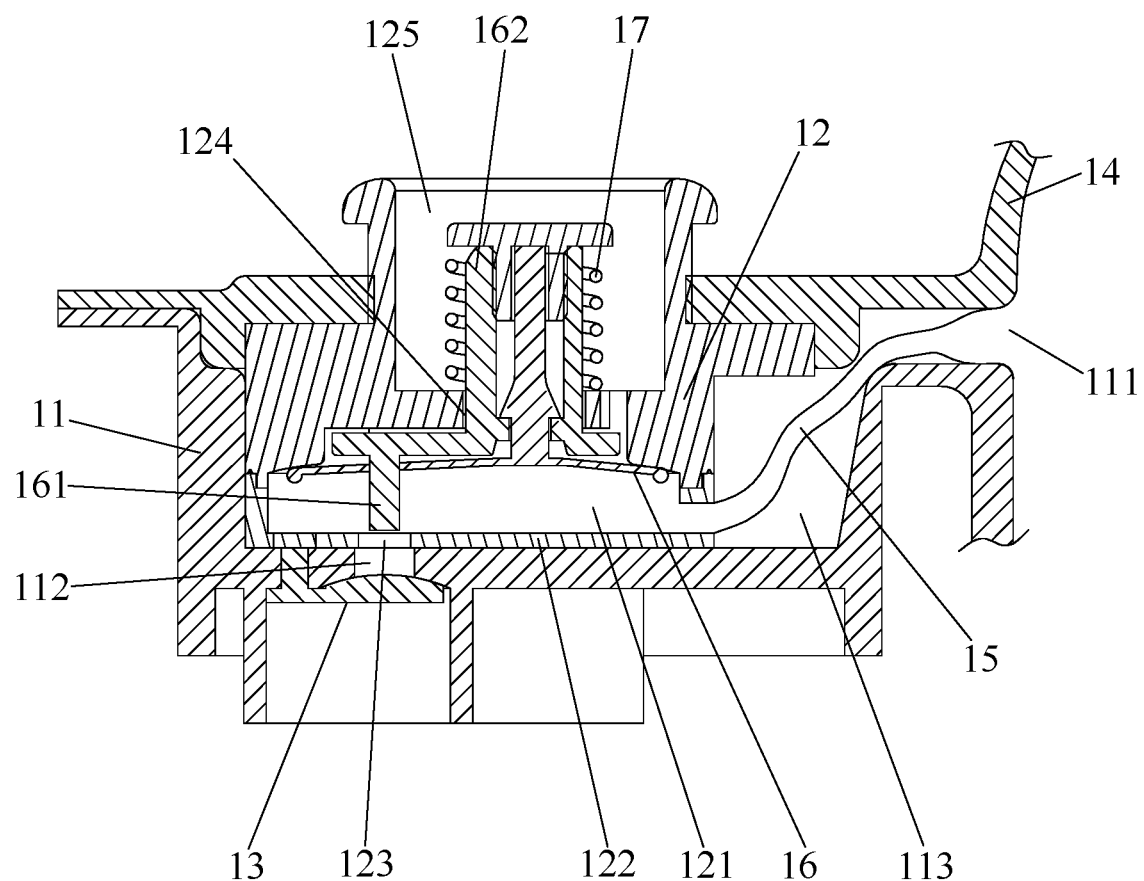
FIG. 5 is a cross sectional view of the inflation system according to the first embodiment of the present invention.

Referring to FIGS. 4 and 5, the bottom wall 122 of the adjuster 12 is provided with a through hole 123 that is communicated with the air cavity 121. When the adjuster 12 adjusts positions, the through hole 123 is selectively communicated with the inflation inlet 112, or the bottom wall 122 selectively blocks off the inflation inlet 112. A plurality of inflation inlets 112 are formed on the bottom of the base 11, which are arranged around the center axis of the base 11. The through hole 123 is selectively communicated with any one of the inflation inlets 112, and the bottom wall 122 of selectively blocks off the rest inflation inlets 112.

Referring to FIG. 5 again, the air cavity 121 is communicated with the air inlet 111 by means of flexible pipe 15. Since the adjuster 12 is movable, thus the airtightness between the adjuster 12 and the base 11 must be severe to prevent air leakage therebetween. In view of this consideration, the flexible pipe 15 is used to communicate the air cavity 121 with the air inlet 111, so that, the air from the air inlet 111 can go into the air cavity directly, without through the base 11. As a result, the inflation effect is improved.

Referring to FIG. 5 again, the inflation system 100 further includes a second sealing device 16. The adjuster 12 is provided with an air vent 124 where the second sealing device 16 is located to seal the air vent 124 unilaterally. That is, the air vent 124 is open only when air discharging is needed, otherwise, it's sealed. Further, the inflation system 100 includes an operating member 162 that is movably configured at the air vent 124, and the second sealing device 16 is fixed on the operating member 162. By means of the operating member 162, the first sealing device 13 can be opened, so that the inflation inlet 112 can be communicated with the air vent 124. Preferably, the first sealing device 13 can be opened by pressing the operating member 162, or by pulling the operating member 162. In this embodiment, the first sealing device 13 is pushed to open. Specifically, the operating member 162 has a pin 161 located above the through hole 123. When pressing the operating member 162, the pin 161 is actuated to push the first sealing device 13 to open, so that the inflation inlet 112 is communicated with the air vent 124. As shown, a cavity 125 is formed on the upper end of the adjuster 12, and the operating member 162 is located in the cavity 125, and a gap is formed between the operating member 162 and the air vent 124 of the adjuster 12. On the other hand, the second sealing device 16 is a check valve, which is a resilient sealing leaf in this embodiment. Specifically, the second sealing device 16 is fixed on the operating member 162 and presses against the inner edge of the air vent 124 hermetically. By means of the second sealing device 16 and the pin 161, when the operating member 162 is pressed, the pin 161 will push the first sealing device 13 to open, thus the inflation system 100 has deflation function. Meanwhile, sine the operating member 162 and the pin 161 are configured at the adjuster 12, thus the pin 161 will only align with one inflation inlet 112 when the adjuster 12 is turned well, by this token, the inflation and the deflation are selective and exclusive, thus safety of the inflatable product is improved.

A spring 17 is configured between the operating member 162 and the adjuster 12, so that the pin 161 can be far away from the first sealing device 13. Specifically, the spring 17 is a compression spring which is arranged around the operating member 162 and located in the cavity 125, one end of the spring 17 is pressed against the upper edge of the operating member 162, and the other end of the spring 17 is pressed against the inner bottom of the cavity 125 of the adjuster 12. Specifically, the spring 17 will make the pin 161 restore after deflation action disappears, so that the pin 161 is restored automatically to withdraw from the through hole 123, therefore deflation of the product is controllable, and the air quantity is adjustable.

In addition, the surface of the base 11 is configured with several markers corresponding with each inflation inlet 112. When the adjuster 12 is turned to one marker, the through hole 123 is aligned with the corresponding inflation inlet 112, so as to inflate.

Figure 6:
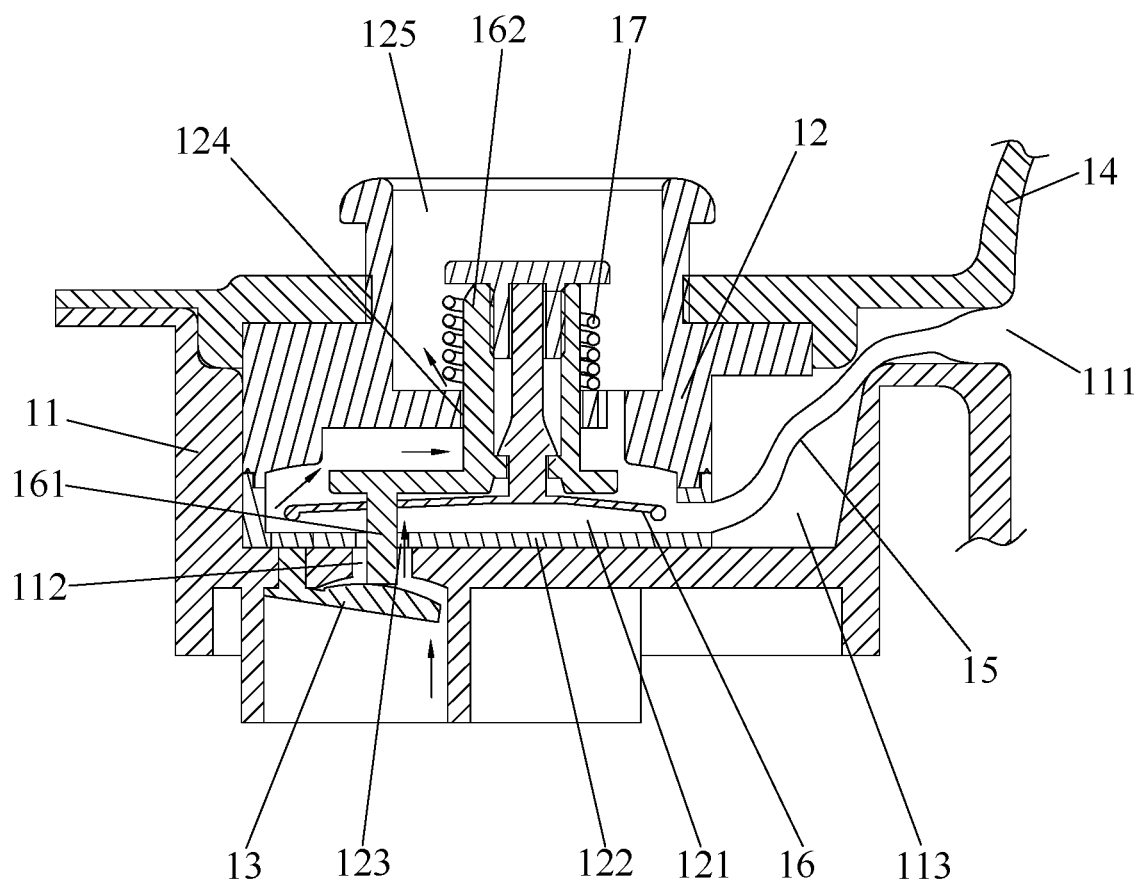
FIG. 6 is a view showing the deflation status of the inflation system according to the first embodiment of the present invention.
Figure 7:
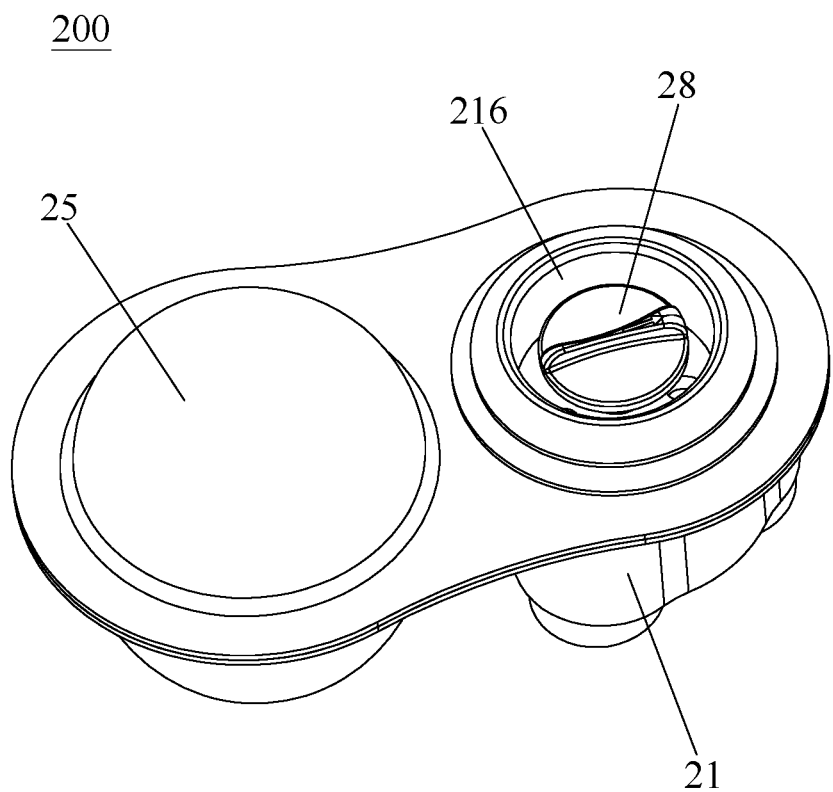
FIG. 7 is a perspective view of an inflation system according to a second embodiment of the present invention.
Figure 8:
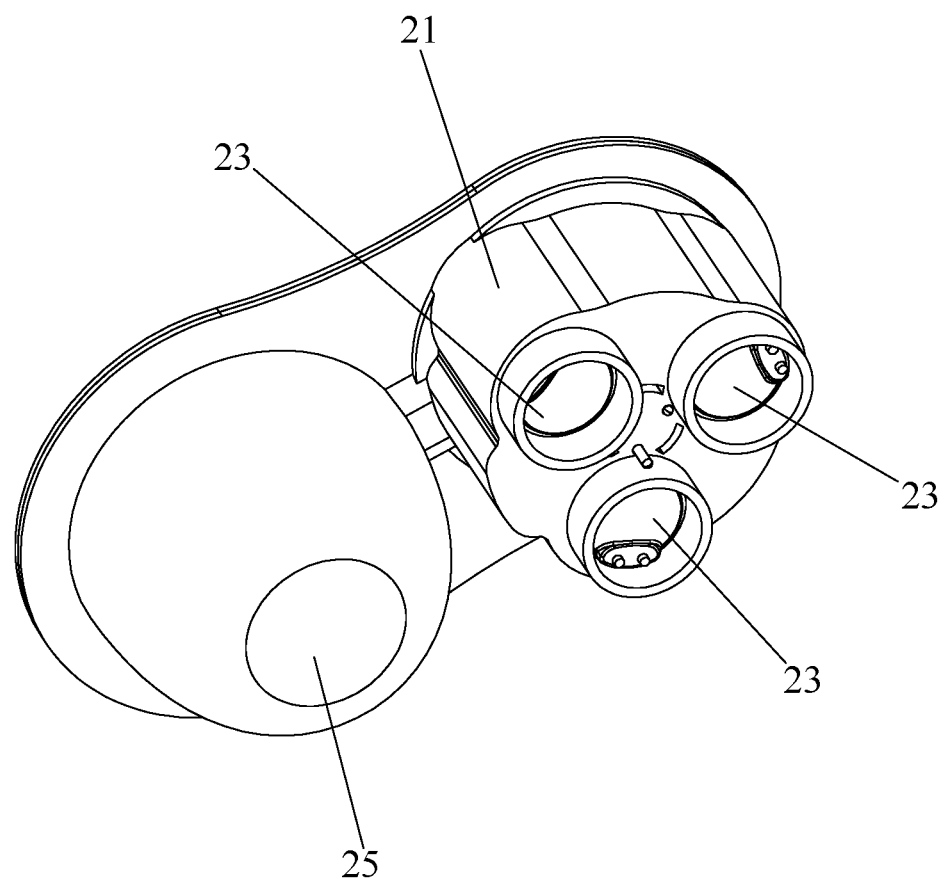
FIG. 8 is another perspective view of the inflation system according to the second embodiment of the present invention.
Figure 9:
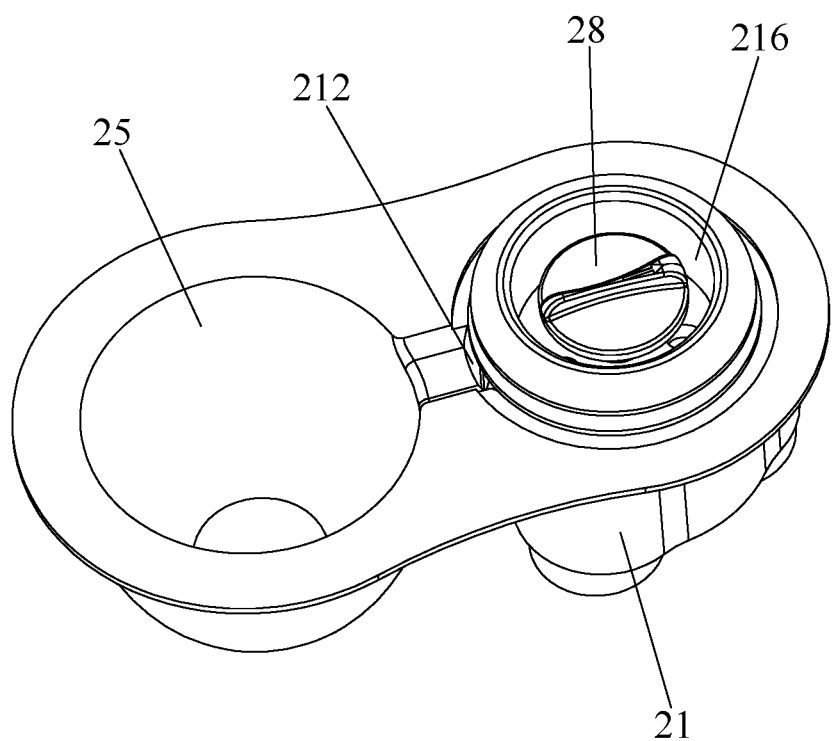
FIG. 9 is a view showing an internal structure of the inflation system according to the second embodiment of the present invention.
Figure 10:
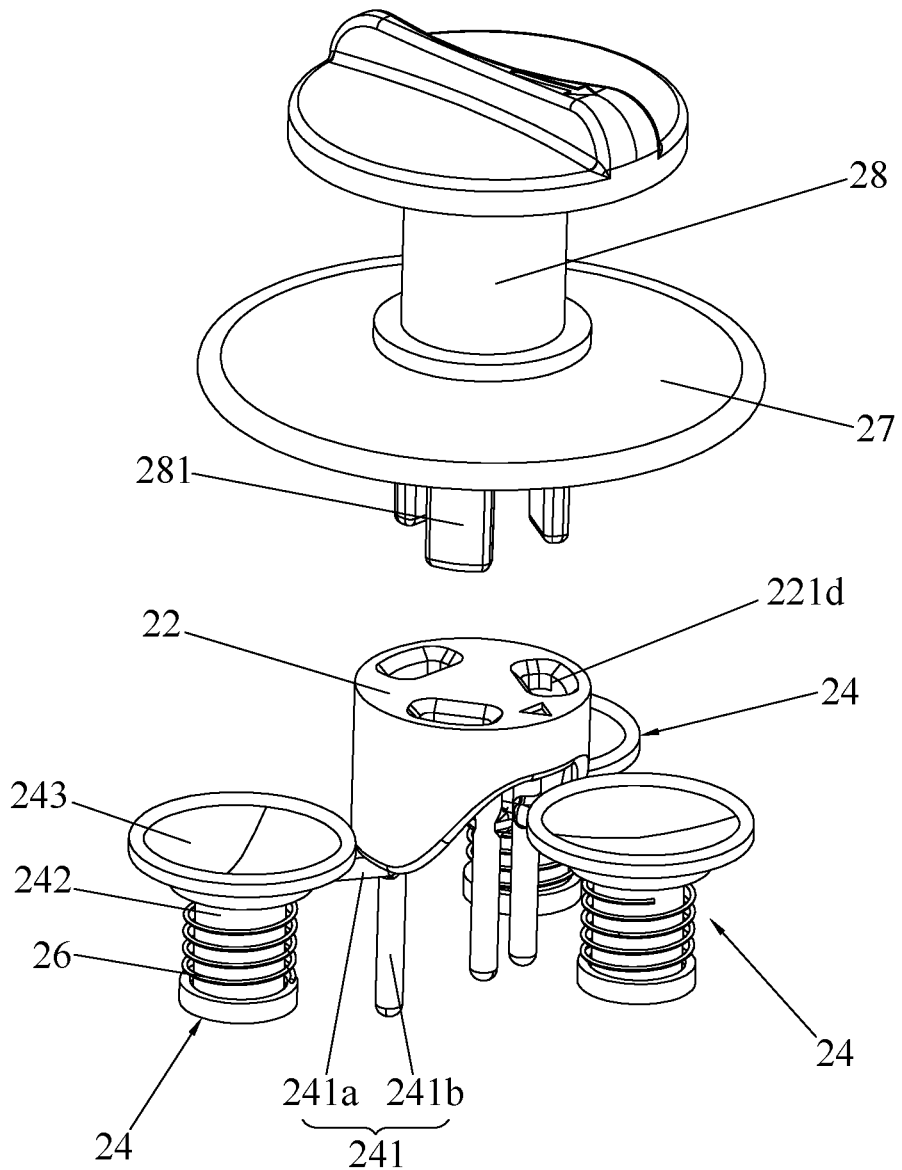
FIG. 10 is an exploded view of the internal structure of the inflation system according to the second embodiment of the present invention.
Figure 11:
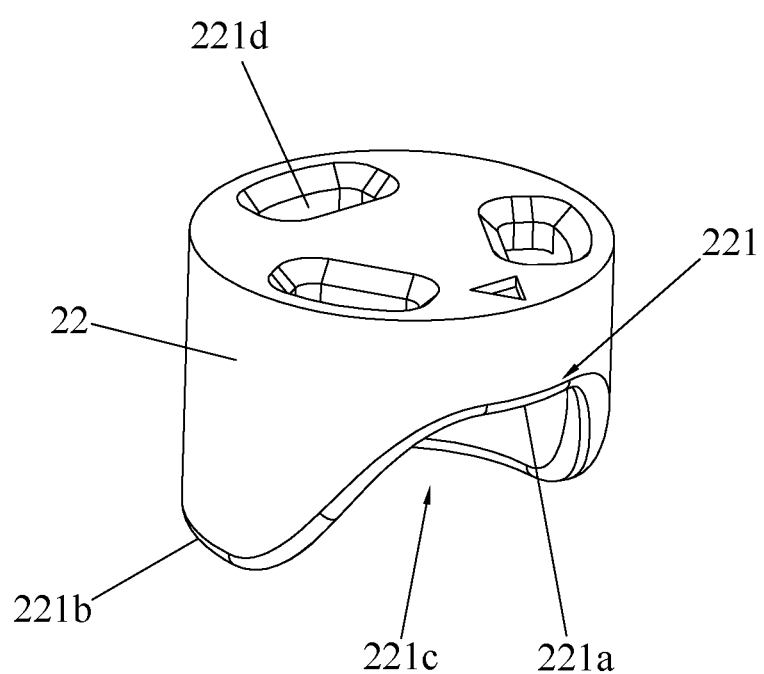
FIG. 11 is a structure view of an adjuster of the inflation system according to the second embodiment of the present invention.

Working principle of the inflation system 100 according to the first embodiment follows, by combination with FIGS. 5 and 6.

Firstly, turning the adjuster 12 to make the through hole 123 to align with the corresponding inflation inlet 112, and then pressing the air bag to make air from the air bag go through the air inlet 111 and the flexible pipe 15, then into the air cavity 121. At this time, air pressure in the air cavity 121 is increased and larger than that in the air pocket of the inflatable product, thus the first sealing device 13 will be pushed, causing the air go into the air pocket of the inflatable product, thereby a first time for inflation is completed. In this process, the second sealing device 16 is kept to be close. Then, external pressure is withdrawn, the air bag restores by virtue of elastic force itself; at this time, the pressure in the air bag is smaller than the outside pressure, thus the second sealing device 16 is pushed, as a result, outer air goes into the air cavity 121 and finally into the air bag through the flexible pipe 15 so as to restore the air bag. After that, a second time for inflation can be proceeded, by pressing the air bag repeatedly.

If deflation is needed, pressing the operating member 162 to move downwards, that is, the second sealing device 16 is actuated to move downwards to separate from the inner edge of the air vent 124, at this time, the air vent 124 is communicated with the air cavity 121. Meanwhile, the pin 161 moves downwards along with the operating member 162 to push the first sealing device 13 to open, thus the inflation inlet 112, the air cavity 121, and the air vent 124 are communicated, and air in the air pocket of the inflatable product can be discharged from the air vent 124.

In comparison with the prior art, since the adjuster 12 is rotatably configured on the base 11, and the adjuster 12 is provided with the air cavity 121 and the through hole 123, thus the through hole 123 can be selectively aligned with and communicated with any one of the inflation inlets 112 by adjusting the position of the adjuster 12, so as to finish the inflation. In some cases, the different inflation inlets 112 can be communicated with different air pockets of the same inflatable product, that is to say, the inflation system 100 can be inflated in multiple channels. If the through hole 123 is aligned with the inflation inlet 112, namely, the inflation inlet 112, the through hole 123, the air cavity 121 and the air inlet 111 are communicated one another, thus inflation enables. Instead, if the through hole 123 fails to align with the inflation inlet 112 and is blocked by the bottom wall 122, that is, the inflation inlet 112 and the through hole 123 are separated from each other to disenable the inflation. By this token, by means of the adjuster 12 and the operating member 162, the multiple inflation inlets 112 (multiple air passages) are controlled, thus the structure of the inflation system 100 is simplified and the size of the inflation system 100 is reduced. The inflation and the deflation are convenient, thus the usage experience is improved. Furthermore, the inflation system is safe because the adjuster 12 must be turned before the inflation and the deflation, thus undesired deflation is prevented thereby improving safety.

As illustrated in FIGS. 7-13, an inflation system according to a second embodiment is shown. The inflation system 200 includes a base 21, an adjuster 22, a first sealing device 23, a spool 24 and an air source 25. The base 21 is provided with a receiving cavity 211, an air inlet 212 and an inflation inlet 213 communicated with the receiving cavity 211, and the air inlet 212 is communicated with the air source 25 which is an air bag. The inflation inlet 213 is located in the inner bottom of the receiving cavity 211. The first sealing device 23 is configured at the inflation inlet 213 to seal the inflation inlet 213 unilaterally, so that the inflation inlet 213 is opened when inflation is needed, and is closed when inflation is unnecessary. Specifically, the first sealing device 23 is a check valve and is in a form of resilient sealing leaf. One end of the resilient sealing leaf is fixed on the base 21, and another end of the resilient sealing leaf is free. The inflation inlet 213 is sealed by the resilient sealing leaf by means of its resilient force, and the resilient sealing leaf can be opened towards the air inlet direction. A receiving cavity 211 is configured in the base 21, and the adjuster 12 is configured in the receiving cavity 211 and is rotatable and turnable. Specifically, the adjuster 12 is provided with a rail 221, the spool 24 is movably configured in the receiving cavity 211 and corresponding with the inflation inlet 213. If the adjuster 22 is rotated, the rail 221 will actuate the spool 24 to move up or down, thereby opening or blocking the inflation inlet 213.

Referring to FIGS. 8-11, the base 21 is provided with a plurality of inflation inlets 213 which are arranged around the center axis of the base 21, each inflation inlet 213 is communicated with an air pocket of the inflatable product. The vale 24 is arranged above the inflation inlet 213. By rotating the adjuster 22, the valve 24 will be actuated by the rail 221 to move up or down. the rail 221 is located at a lower edge of the adjuster 22, the rail 221 is provided with a top 221a and a bottom 221b, the lower edge of the adjuster 22 is provided with a notch 221c so as to form the top 221a, and the flat portion of the lower edge of the adjuster 22 is the bottom 221b. Further, the inflation system 200 includes a first spring 26 which is used for providing spring force between the valve 24 and the rail 221. When the spool 24 located at the top 221a is moved upwards under the spring force of the first spring 26, the inflation inlet 213 can be opened. The spool 24 located at the bottom 221b is pressed against the bottom 221b and the edge of the inflation inlet 213 to block off the inflation inlet 213. In such a way, different inflation inlets 213 can be chosen to communicate with the different air pockets of the inflatable product, thus the multiple inflation inlets 112 (multiple air passages) are controlled, and the structure of the inflation system 100 is simplified and the size of the inflation system 100 is reduced. The inflation and the deflation are convenient, thus the usage experience is improved.

Referring to FIG. 9-12, the valve 24 includes a support 241, a base 242 and a sealing member 243. The support 241 includes a cross bar 241a and a vertical bar 241b. One end of the cross bar 241 is fixed to the vertical member 241b, the vertical member 241b is movably inserted into a guide hole 214 of the base 21, and the cross bar 241a is pressed against the rail 221. Particularly, the upper end of the vertical member 241b is protruded to the inner side of the adjuster 22. The base 242 is connected to another end of the cross bar 241a of the support 241, the sealing member 243 is configured at the upper end of the base 242 and seals the edge of the inflation inlet 213.

Referring to FIGS. 9, 10 and 12 again, the inflation system 200 further includes a second sealing device 27, and the base 21 is provided with an air vent 215 intercommunicating with the air cavity 211, and the second sealing device 27 which is a check valve is configured at the air vent 215 to seal the air vent 215 unilaterally. In this embodiment, the second sealing device 27 is an elastic sealing plate which is sealed on the inner edge of the air vent 215. As shown, the inflation system 200 further includes an operating member 28 configured on the base 21. Particularly, the operating member 28 is rotatably configured on the base 21 and connected with the adjuster 22. That is, the adjuster 22 is actuated by the operating member 28. Optionally, in other embodiments, the adjuster 22 can be actuated by pressing the operating member 28. For example, a conversion device is arranged between the operating member 28 and the adjuster 22, by which a pressing action is converted into rotation action, thus the adjuster 22 can be rotated. Specifically, in this embodiment, the operating member 28 is provided with a leg 281 which is corresponding with the spool 24, the leg 281 is movably inserted into the hole 221d of the adjuster 22 and pressed against the support 241. The operating member 28 is capable of moving along a central axis of the adjuster 22, and the outer wall of the operating member 28 is matched with the inner wall of the base 21, with a certain spacing. The second sealing device 27 is fixed to the operating member 28 and is actuated by the operating member 28 to open the air vent 215 and actuate the leg 281 to push the support 241 of the spool 24, and the first sealing device 23 is pushed by the spool 24, so that the inflation inlet 213 is communicated with the receiving cavity 211. By using the operating member 28, the adjuster 22 can be rotated, which is convenient. In addition, when pressing the operating member 28, the first sealing device 23 is pushed to open, so that the inflation system has a function of deflation. Meanwhile, since the spool 24 is connected with the adjuster 22, therefore different inflation inlet 213 can be chosen by rotating the adjuster, and the rest inflation inlets are blocked. In such a way, the inflation and deflation are selective, thus undesired deflation is prevented, thereby improving safety of the inflatable products.

Figure 12:
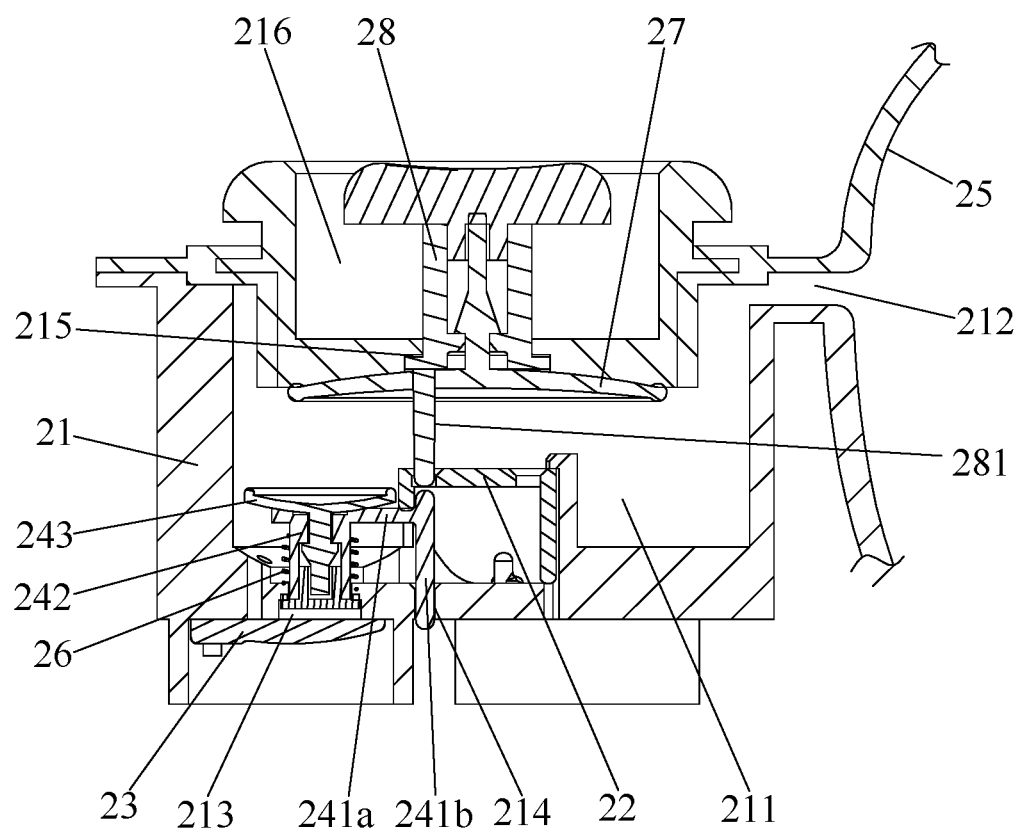
FIG. 12 is a cross sectional view of the inflation system according to the second embodiment of the present invention.

As illustrated in FIG. 12, a spring 28 is configured between the operating member and the base 21, so that the air vent 215 is blocked by the second sealing device 27. Specifically, the spring 28 is a compression spring which is arranged around the operating member 28 and located in the cavity 216 at the side of the base 21, one end of the spring 28 is pressed against the upper edge of the operating member 28, and the other end of the spring 28 is pressed against the inner bottom of the cavity 216 of the base 21. Specifically, the spring 28 will make the operating member 28 restore after deflation action disappears, so that the spool 24 is restored automatically to deviate from the first sealing device 23, therefore deflation of the product is controllable, and the air quantity is adjustable.

In addition, a plurality of markers is configured on the surface of the base 21 which are corresponding with each inflation inlet 213. When the adjuster 22 is turned to one of markers, the corresponding inflation inlet 213 will be turned on, to inflate.

Figure 13:
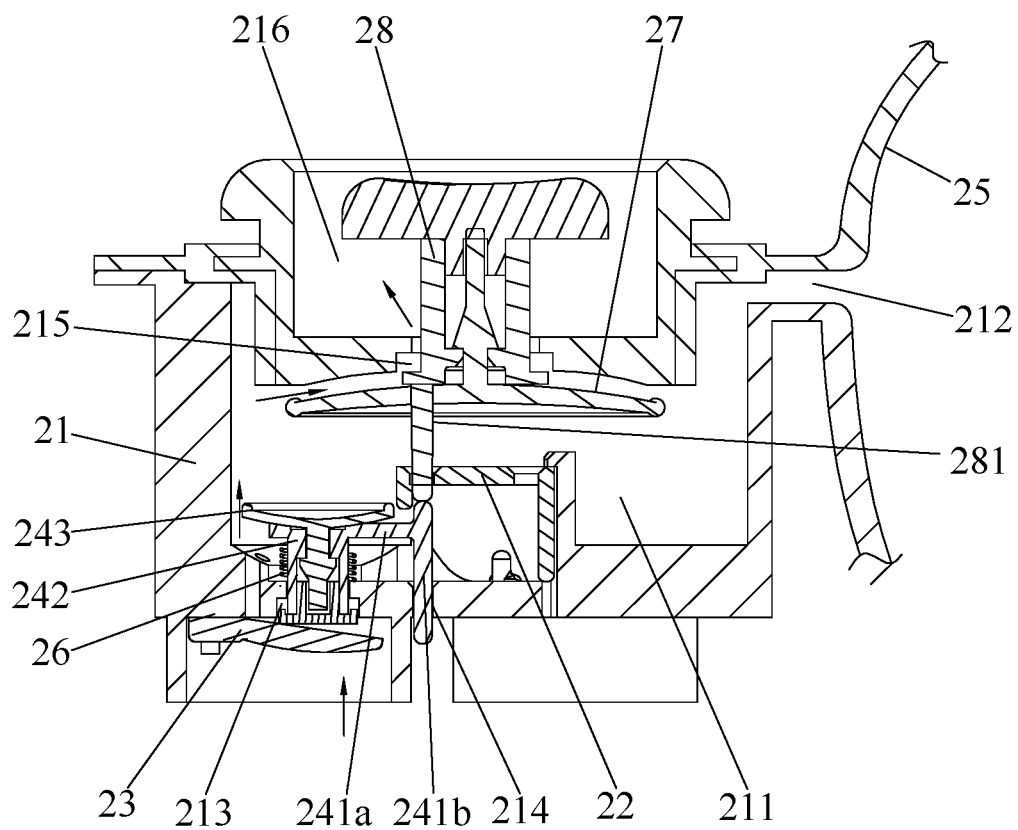
FIG. 13 is a view showing the deflation status of the inflation system according to the second embodiment of the present invention.
Figure 14:
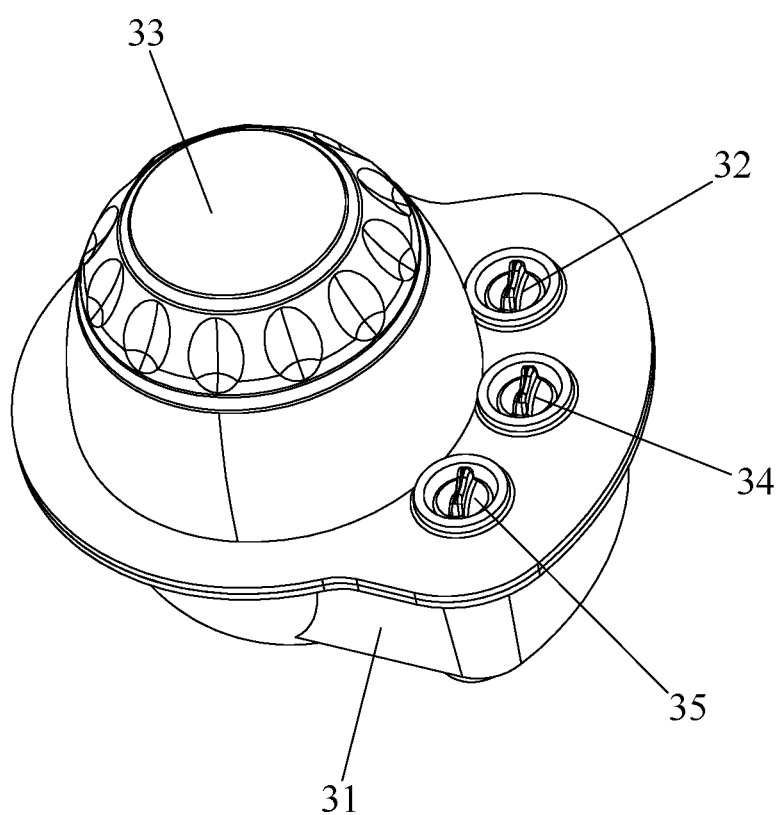
FIG. 14 is a perspective view of an inflation system according to a third embodiment of the present invention.
Figure 15:
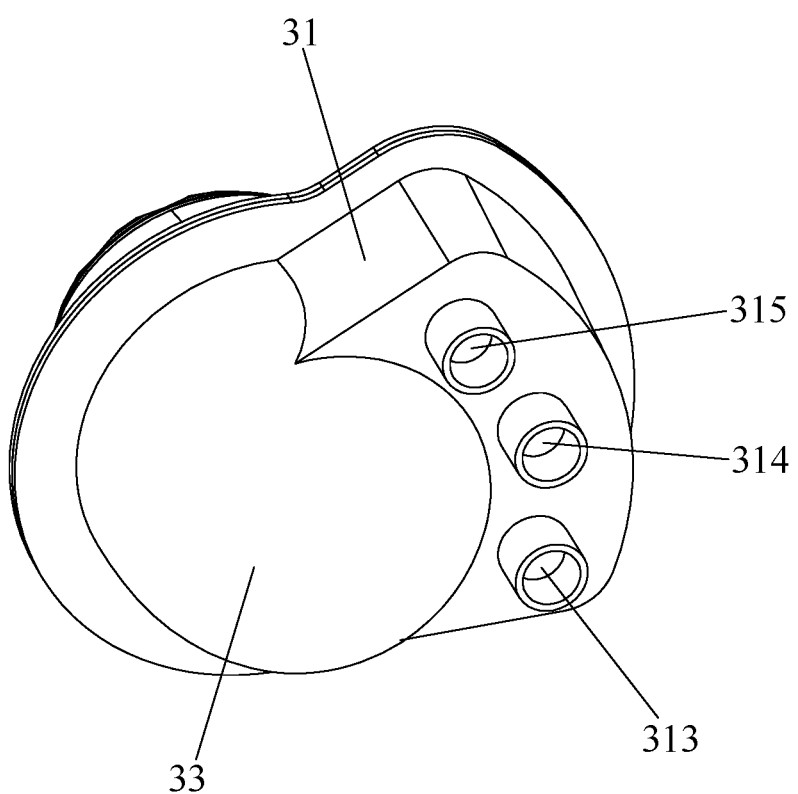
FIG. 15 is another perspective view of the inflation system according to the third embodiment of the present invention.
Figure 16:
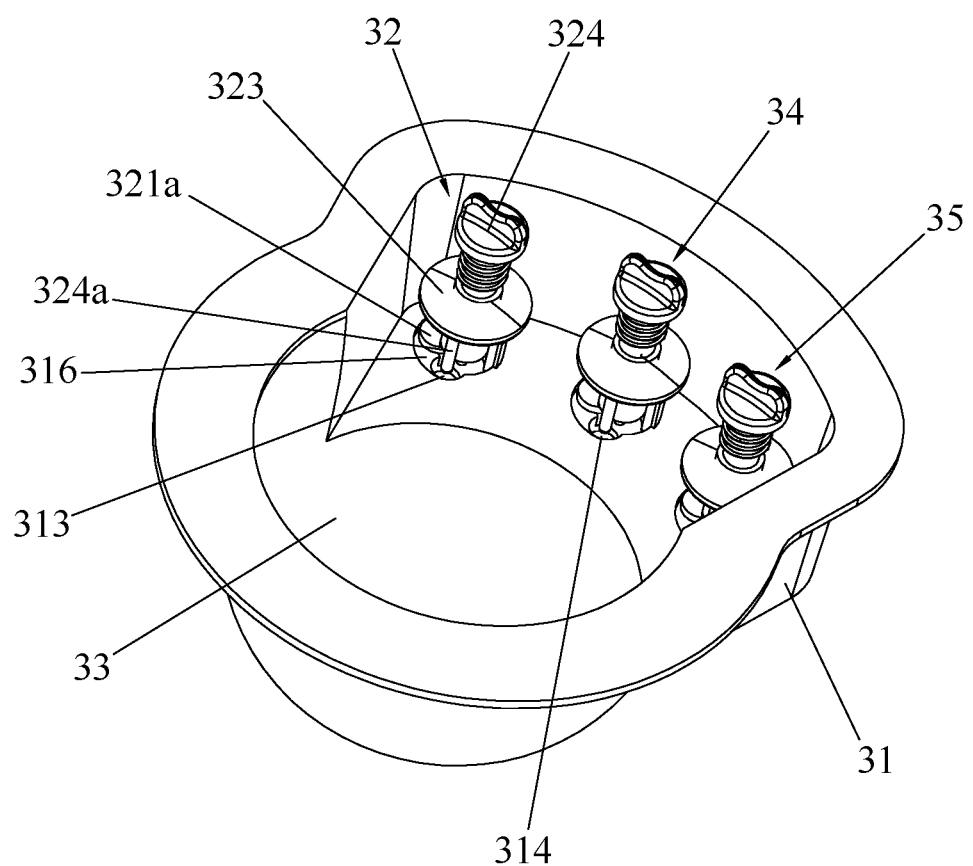
FIG. 16 is a view showing the internal structure of the inflation system installing on the base according to the third embodiment of the present invention.

By combining with FIGS. 12 and 13, the working principle of the inflation system 200 follows.

Before the inflation, turning the operating member 28 to the desired marker, so that the adjuster 22 is rotated to actuate the spool 24, at this time, the top position 221a of the rail 221 is aligned with the marker, the spool 24 located at the marker moves upwards due to the spring force of the first spring 26, thereby the desired inflation inlet 213 is opened, and the rest valve bodies 24 are pressed by the bottom 221b of the rail 221 to move downwards, and finally block the inflation inlets 213. At this time, pressing the air bag, air in the air bag flows through the air inlet 212, the receiving cavity 211, and the inflation inlet 213, in turn; since the air pressure of the receiving cavity 211 is increase and larger than that in the air pocket of the inflatable product, thus the first sealing device 23 is pushed to make air go into the air pocket of the inflatable product, while the second sealing device 27 is kept closed, thus far, a first time for inflation completes. After that, external pressure is withdrawn, causing the air bag to restore due to the elastic force itself. At this time, the pressure in the air bag is smaller than that of the outside, thus the second sealing device 27 is opened to cause air to go into the receiving cavity 211 and finally into the air bag to restore it. After that, the air bag can be pressed again to complete the second time for inflation. Repeating the above steps, the inflatable products can be inflated continuously.

When there is a need to deflate the inflatable product connected with the current inflation inlet 213, pressing the operating member 28 to cause the leg 281 to push the support 241 of the spool 24 which is corresponding with the current inflation inlet 213, so that the spool 24 moves down to push the first sealing device 23, at this time, the inflation inlet 213, the receiving cavity 211, the gap between the operating member 28 and the base 21, and the air vent 215 are communicated, thereby the high-pressure air in the air bag of the inflatable product is discharged from the air vent 215.

In comparison with the prior art, since the adjuster 12 is rotatably configured on the base 11, and the adjuster 12 is provided with the air cavity 121 and the through hole 123, thus the through hole 123 can be selectively aligned with and communicated with any one of the inflation inlets 112 by adjusting the position of the adjuster 12, so as to finish the inflation. In some cases, the different inflation inlets 112 can be communicated with different air pockets of the same inflatable product, that is to say, the inflation system 100 can be inflated in multiple channels. If the through hole 123 is aligned with the inflation inlet 112, namely, the inflation inlet 112, the through hole 123, the air cavity 121 and the air inlet 111 are communicated one another, thus inflation enables. Instead, if the through hole 123 fails to align with the inflation inlet 112 and is blocked by the bottom wall 122, that is, the inflation inlet 112 and the through hole 123 are separated from each other to disenable the inflation. By this token, by means of the adjuster 12 and the operating member 162, the multiple inflation inlets 112 (multiple air passages) are controlled, thus the structure of the inflation system 100 is simplified and the size of the inflation system 100 is reduced. The inflation and the deflation are convenient, thus the usage experience is improved. Furthermore, the inflation system is safe because the adjuster 12 must be turned before the inflation and the deflation, thus undesired deflation is prevented thereby improving safety.

As shown in FIGS. 14-19, an inflation system according to a third embodiment is shown. The inflation system 300 is applicable to inflatable products such as inflatable toys, swimming rings, inflatable pillows, and air mattresses, and includes a base 31, multiple controlling valves and an air source 33. The base 31 is provided with a receiving cavity 311, an air inlet 312 communicated with the receiving cavity 311, multiple inflation inlets and multiple air vents. Specifically, the air inlet 312 is communicated with the air source 33 which is an air bag. Each inflation inlet is communicated with an air pocket of the inflatable product. The air vents are corresponding with the inflation inlets, and the control valves are corresponding with the inflation inlets. For example, the control valves includes a first control valve 32, a second control valve 34 and a third control valve 35, the inflation inlets includes a first inflation inlet 313, a second inflation inlet 314 and a third inflation inlet 315, and the air vents includes a first air vent 317, a second air vent and a third air vent. Each inflation inlet is arranged on the base 31, each air vent is arranged on the surface of the base 31. The first control valve 32 is corresponding with the first inflation inlet 313 and the first air vent 317 respectively, the second control valve 34 is corresponding with the second inflation inlet 314 and the second air vent respectively, and the third control valve 35 is corresponding with the third inflation inlet 315 and the third air vent respectively. Note, the structures and the functions of the control valves 32, 34, 35 are the same, thus only one control valve is described thereinafter.

Figure 17:
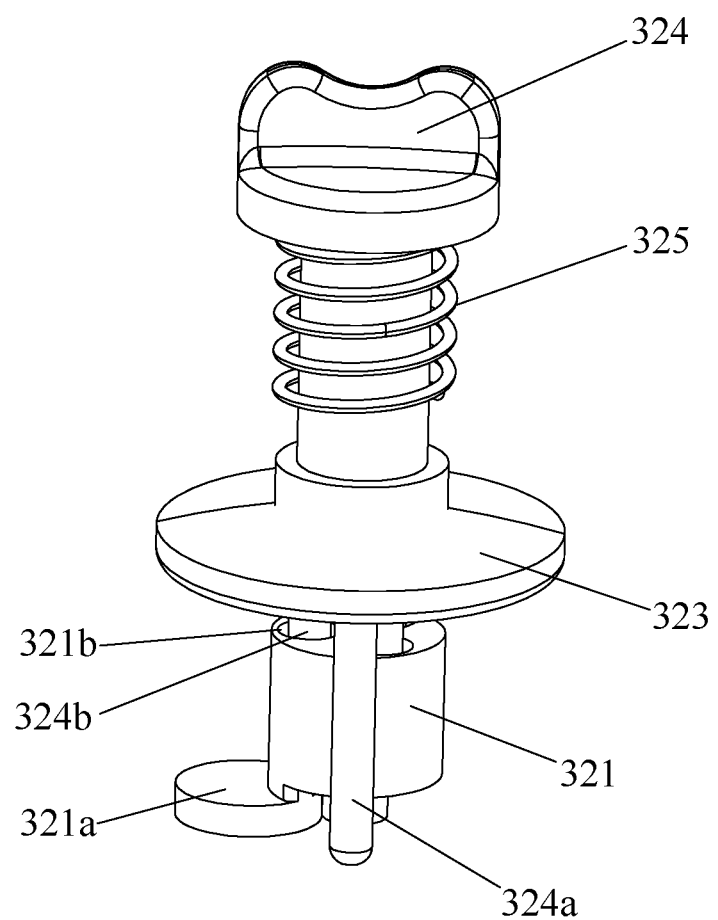
FIG. 17 is a view of the internal structure of the inflation system according to the third embodiment of the present invention.
Figure 18:
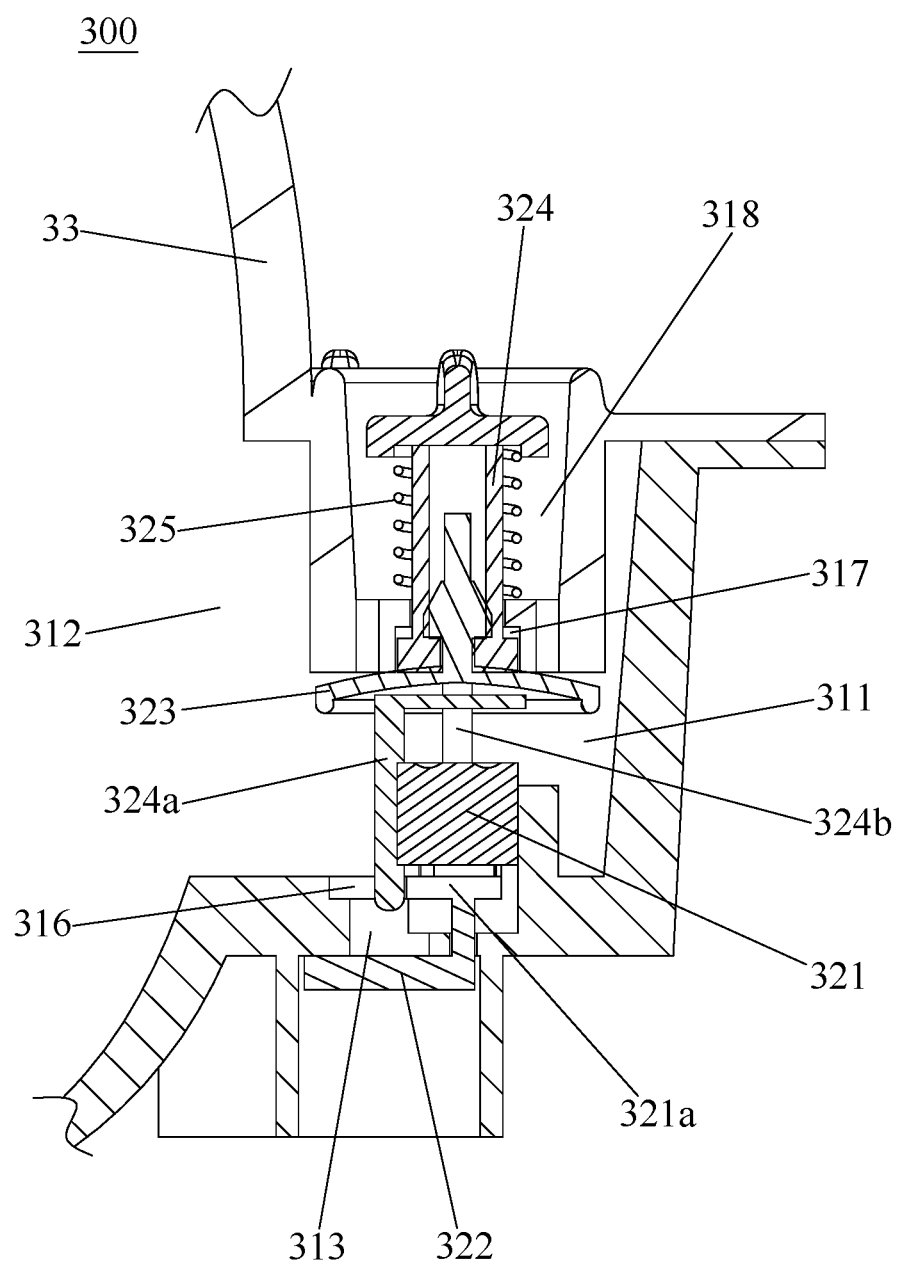
FIG. 18 is a cross sectional view of the inflation system according to the third embodiment of the present invention.

Referring to FIGS. 17 and 18, the first control valve 32 includes an adjuster 321 and a first sealing device 322. The first sealing device 322 is configured at the inflation inlet 313 to seal the inflation inlet 313 unilaterally, so that the inflation inlet 313 is opened when inflation is needed and is closed when inflation is unnecessary. Specifically, the first sealing device 322 is a check valve and is in a form of resilient sealing leaf. One end of the resilient sealing leaf is fixed on the base 31, and another end of the resilient sealing leaf is free. The inflation inlet 313 is sealed by the resilient sealing leaf by means of its resilient force, and the resilient sealing leaf can be opened towards the air inlet direction. The adjuster 321 is configured in the receiving cavity 311 and capable of rotating around the center axis itself, and a limiting part 321a that is circular and is provided at the adjuster 321. When the adjuster 321 rotates, the limiting part 321a will be actuated to open or close the first inflation inlet 313, so that the first inflation inlet 313 can be communicated with or hermetically separated from the receiving cavity 311. A recess area 316 is formed at the inner bottom of the receiving cavity 311, the first inflation inlet 313 is formed at the recess area 316, and the limiting part 321a is capable of swinging in the recess area 316. Specifically, the recess area 316 guides and limits the limiting part 321a, which benefits to seal the first inflation inlet 313.

Referring to FIGS. 17 and 18 again, the first control valve 32 further includes a second sealing device 323 and an operating member 324. The second sealing device 323 is located at the first air vent 317 to seal the air vent 317 unilaterally. That is, the air vent 317 is open only when air discharging is needed, otherwise, it's sealed. Specifically, the second sealing device 323 is in a form of resilient sealing leaf which is fixed on the operating member 324 and pressed against the inner edge of the first air vent 317. The operating member 324 is capable of rotating circumferentially and is movably configured at the air vent 317, which has a lower end extended into the receiving cavity 311 and an upper end protruded out of the base 31 to reach the cavity 318 of the base 31. The operating member 324 is connected with the adjuster 321 to drive the adjuster 321. By means of the operating member 324, the first sealing device 322 can be opened, so that the inflation inlet 313 can be communicated with the air vent 317. Preferably, the first sealing device 322 can be opened by pressing or pulling the operating member 324, and in turn driving the first sealing device 322. In this embodiment, the first sealing device 322 is pushed to open. Specifically, the operating member 324 has a pin 324a located above the first inflation inlet 313, and the pin 324a and the limiting part 321a are configured at an angle along a bottom projection direction of the receiving cavity 311. That is, one of the pin 324a and the limiting part 321a is located above the first inflation inlet 313. When pressing the operating member 324, the pin 324a is actuated to push the first sealing device 322 to open, so that the inflation inlet 313 is communicated with the air vent 311. Specifically, the operating member 324 has a leg 324b, a hole 321b is firmed on the upper end of the adjuster 321, and the leg 324b is movably inserted into the hole 321b. When the operating member 324 is rotated, the leg 324b will actuate the adjuster 321 to rotate, and the pin 324a will be pushed if the operating member 324 is pressed. By means of the operating member 324, the rotation of the adjuster 321 is convenient. In addition, due to the second sealing device 323 and the pin 324a, the first sealing device 322 is pushed to be open by the pin 324a when the operating member 324 is pressed, thus the inflation system 300 has function of deflation. The first control valve 32 further includes a spring 325 which is a compression spring. Specifically, one end of the spring 325 is pressed against the upper edge of the operating member 324, and the other end of the spring 325 is pressed against the inner bottom of the cavity 318. Specifically, the spring 325 will make the pin 324a restore after deflation action disappears, so that the first sealing device 322 is restored automatically, therefore deflation of the product is controllable, and the air quantity is adjustable.

Further, markers are configured on the surface of the base, which indicate the current status of the inflation inlets.

Figure 19:
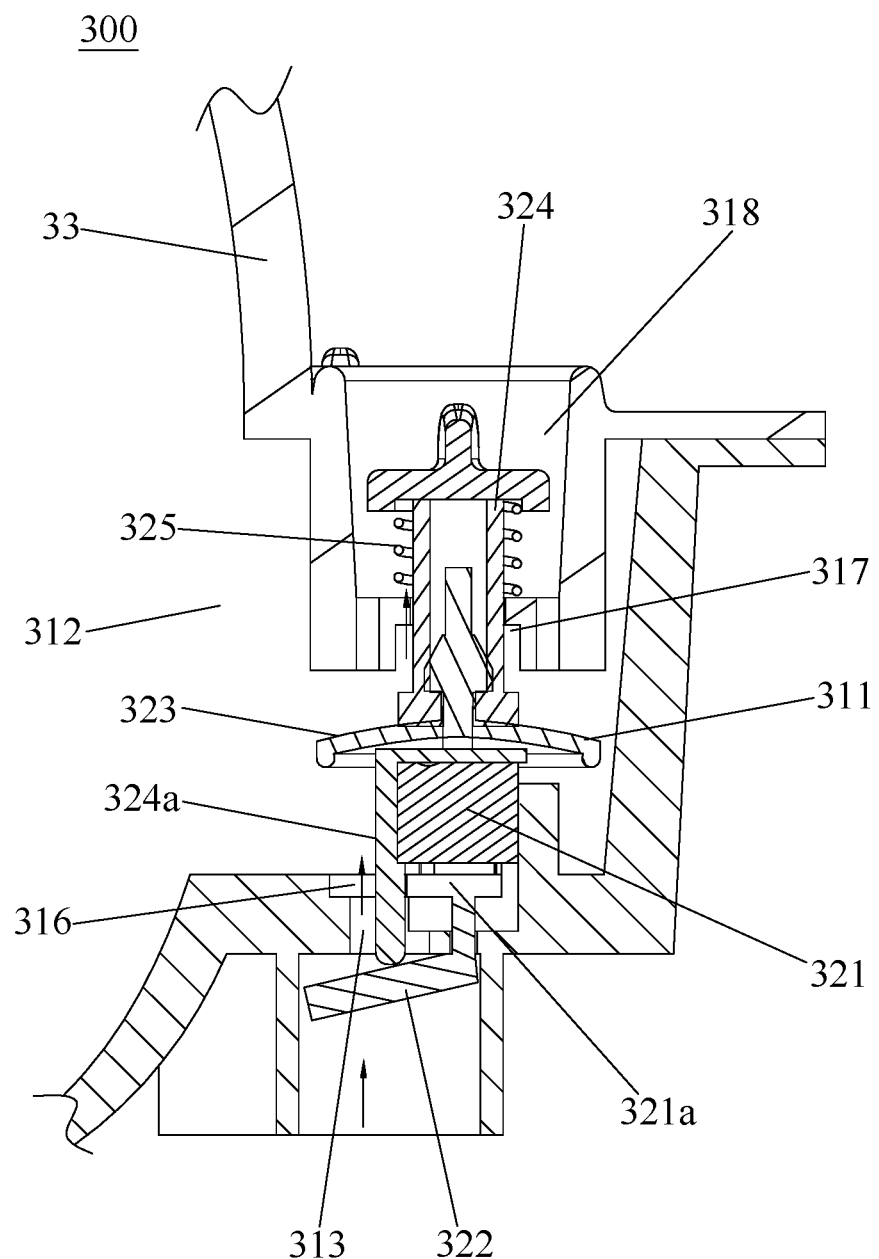
FIG. 19 is a view showing the deflation status of the inflation system according to the third embodiment of the present invention.

By combining with FIGS. 17 and 19, the working principle of the inflation system 300 follows.

Before the inflation, choosing the desired inflation inlet. For example, the first inflation inlet 313 is desired, so the first control valve 32 is to be handled, other control valves are turned to be closed. Firstly, turning the operating member 324, causing the leg 324b to actuate the adjuster 321, thus the limiting part 321a is rotated accordingly. When the operating member 324 is turned to open position, the limiting part 321a is rotated horizontally and completely away from the first inflation inlet 313, at this time, the first inflation inlet 313 is communicated with the receiving cavity 311, meanwhile, the pin 324a is turned to the position where in located above the first inflation inlet 313. At this time, pressing the air bag, air in the air bag flows through the air inlet 312, the receiving cavity 311, and the inflation inlet 213, in turn; since the air pressure of the receiving cavity 311 is increased and larger than that in the air pocket of the inflatable product, thus the first sealing device 322 is pushed to make air go into the air pocket of the inflatable product, while the second sealing device 323 is kept closed, thus far, a first time for inflation completes. After that, external pressure is withdrawn, causing the air bag to restore due to the elastic force itself. At this time, the pressure in the air bag is smaller than that of the outside, thus the second sealing device 323 is opened to cause air to go into the receiving cavity 311 and finally into the air bag to restore it. After that, the air bag can be pressed again to proceed with a second time for inflation. Repeating the above steps, the inflatable products can be inflated continuously.

When there is a need to deflate the inflatable product connected with the current inflation inlet, pressing the operating member 324 to cause the second sealing device 323 move downwards, so that the second sealing device 323 disengages from the edge of the first air vent 317, at this time, the air vent 317 and the receiving cavity 311 are communicated with each other. Meanwhile, the pin 324a also moves down to push the first sealing device 322, therefore, the inflation inlet, the receiving cavity 311, the gap between the air vent 317 and the receiving cavity 311, and the air vent 317 are communicated, thereby the high-pressure air in the air bag of the inflatable product is discharged from the air vent 317.

The operations for the second and the third inflation inlets 314, 315 correspondingly with the second and the third control valves 34 and 35 are the same, which are omitted here.

In comparison with the prior art, because the adjuster 321 of the present embodiment is turnable and configured in the base 31, inflation inlets are configured at the base 31, and a limiting part 321a is provided at the adjuster 321, thus the position of the limiting part 321a can be adjusted by turning the adjuster 321, so that the limiting part 321a can selectively align with the inflation inlet. When there is no alignment between the limiting part 321a and the inflation inlet, that is, the inflation inlet is communicated with the receiving cavity 311, thereby inflation can be carried out through the air inlet 312. When there is an alignment between the limiting part 321a and the inflation inlet, that is, the inflation inlet is hermetically separated from the receiving cavity 311, thus inflation cannot be carried out through the air inlet 312, therefore the air quantity in the inflatable product is sealed, undesired deflation is prevented accordingly, thereby improving safety of the inflatable product.

Accordingly, a method of inflating includes the following steps:

S1, providing an inflation system which includes a base, an adjuster arranged in a receiving cavity of the base, and a first sealing device for unilaterally sealing inflation inlets of the base;

S2, turning the adjuster, so as to communicate an air inlet of the receiving cavity with the inflation inlet. Specifically, the adjuster is provided with a limiting part, the limiting part will be actuated if the adjuster is turned, thereby opening the inflation inlet. The limiting part has two movement manners which include horizontal movement and axial movement, specifically, the limiting part can horizontally move on a plane perpendicular to the rotating axis of the adjuster, or move along the rotating axis of the adjuster.

S3, inflating high pressure air through the inflation inlet, thereby opening the first sealing device to carry out inflation.

When there is a need to deflate, by pulling or pressing, the first sealing device is opened, thereby deflation enables.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An inflation system, comprising:
   a base, provided with a receiving cavity, an air inlet and two or more inflation inlets;
   an air bag, connected with the air inlet;
   an adjuster, configured in the receiving cavity; and
   a first sealing device, located at each inflation inlet and adapted for sealing each inflation inlet;
   wherein the adjuster is turnable to open a desired inflation inlet at a communication position or close the desired inflation inlet at a separation position, at the communication position, the first sealing device is openable under an action of high pressure air to communicate the desired inflation inlet with the air inlet; at the separation position, the adjuster stops high pressure air from opening the first sealing device thereby separating the desired inflation inlet from the air inlet.

2. The inflation system according to claim 1, wherein the adjuster is rotatably configured in the receiving cavity.

3. The inflation system according to claim 1, wherein the first sealing device is adapted for unilaterally sealing the desired inflation inlet, so that the desired inflation inlet is opened when inflation is needed and is sealed when inflation is unnecessary.

4. The inflation system according to claim 1, wherein an air cavity is defined in the adjuster and communicated with the air inlet, a through hole communicated with the air cavity is provided at a bottom wall of the adjuster; by means of the adjuster, one of the inflation inlets is selectively communicated with the through hole or sealed by the bottom wall.

5. The inflation system according to claim 4, wherein the through hole is selectively communicated with any one of the inflation inlets, and the bottom wall is adapted for sealing the rest inflation inlets.

6. The inflation system according to claim 4, wherein the air cavity is communicated with the air inlet via a flexible tube.

7. The inflation system according to claim 4, further comprising a second sealing device, wherein the adjuster is provided with an air vent communicating with the air cavity, and the second sealing device is configured at the air vent to seal the air vent unilaterally.

8. The inflation system according to claim 7, further comprising an operating member movably configured at the air vent, wherein the second sealing device is fixed on the operating member, and the first sealing device is actuated to open thereby communicating the desired inflation inlet with the air vent.

9. The inflation system according to claim 8, wherein the operating member is provided with a pin, by which the operating member actuates to open the first sealing device.

10. The inflation system according to claim 8, wherein a spring is configured between the operating member and the adjuster, by which the operating member actuates to release the first sealing device.

11. The inflation system according to claim 1, further comprising spools movably configured relative to the adjuster and corresponding with the desired inflation inlet, and the adjuster is adapted for driving the spools to move up and down to connect with or block off the desired inflation inlet.

12. The inflation system according to claim 11, wherein the adjuster is provided with a rail, by which the adjuster drives the spool to move.

13. The inflation system according to claim 11, wherein each spool is corresponding to each inflation inlet.

14. The inflation system according to claim 12, wherein the rail has a top and a bottom, the spools located at the top of the rail are adapted for communicating with the desired inflation inlet, and the spools located at the bottom of the rail are adapted for blocking off the desired inflation inlet.

15. The inflation system according to claim 14, wherein the rail is located at a lower edge of the adjuster, and the lower edge of the adjuster is provided with a recess to form the top of the rail; the inflation system further comprises a first spring element for supplying spring force to make the spools press against the rail.

16. The inflation system according to claim 1, wherein the adjuster is provided with a limiting part which can be driven to block off or open the desired inflation inlet, thereby hermetically separating the receiving cavity from the inflation inlet or communicating the receiving cavity with the inflation inlet.

17. The inflation system according to claim 11, further comprising a second sealing device, wherein the base is provided with an air vent communicating with the air cavity, and the second sealing device is configured at the air vent to seal the air vent unilaterally.

18. The inflation system according to claim 17, further comprising an operating member configured on the base, wherein the operating member is connected with the adjuster to drive the adjuster.

19. The inflation system according to claim 18, wherein the operating member is movably configured at the air vent, the second sealing device is fixed to the operating member, and the first sealing device is opened by the operating member to communicate the inflation inlet with the air vent.

20. The inflation system according to claim 19, wherein the operating member is provided with a pin, the pin and the limiting part are configured at an angle along a bottom projection direction of the receiving cavity, and the first sealing device is driven to open by means of the pin of the operating member.

* * * * *